(12) United States Patent
Liu

(10) Patent No.: US 10,822,012 B2
(45) Date of Patent: Nov. 3, 2020

(54) ROCKING CHAIR

(71) Applicant: ZHONGSHAN CITY TONGYINBABY CO., LTD., Zhongshan, Guangdong (CN)

(72) Inventor: Weibing Liu, Guangdong (CN)

(73) Assignee: ZHONGSHAN CITY TONGYINBABY CO., LTD., Zhongshan (CN)

( * ) Notice: Subject to any disclaimer, the term of this patent is extended or adjusted under 35 U.S.C. 154(b) by 0 days.

(21) Appl. No.: 16/739,844

(22) Filed: Jan. 10, 2020

(65) Prior Publication Data

US 2020/0148246 A1 May 14, 2020

Related U.S. Application Data

(63) Continuation of application No. PCT/CN2018/095011, filed on Jul. 9, 2018.

(30) Foreign Application Priority Data

Jul. 12, 2017 (CN) .................... 2017 2 0847643 U

(51) Int. Cl.
*B62B 9/22* (2006.01)
*A47D 13/10* (2006.01)
*B62B 7/06* (2006.01)
*B62B 9/08* (2006.01)

(52) U.S. Cl.
CPC .............. *B62B 9/22* (2013.01); *A47D 13/105* (2013.01); *B62B 7/06* (2013.01); *B62B 9/082* (2013.01)

(58) Field of Classification Search
CPC ........ B62B 9/22; A47D 13/105; A47D 13/02; A47D 13/102; A47D 13/10
See application file for complete search history.

(56) References Cited

U.S. PATENT DOCUMENTS

| | | | |
|---|---|---|---|
| 2,644,958 A * | 7/1953 | Davis ....................... | A47D 9/02 5/109 |
| 2,904,344 A * | 9/1959 | Lombardo ................ | B62B 9/22 280/47.1 |
| 6,519,792 B2 * | 2/2003 | Chen ........................ | B62B 9/22 5/107 |
| 9,027,389 B2 * | 5/2015 | Abboud ................. | A61B 18/02 73/40 |

(Continued)

*Primary Examiner* — John D Walters
*Assistant Examiner* — James J Trigg

(57) ABSTRACT

This invention provides a rocking chair comprising a rear support frame arranged with a rotating part, a front rocking frame pivoted to the rear support frame and used as a front support frame, and an electric rocking drive mechanism driving the front rocking frame to continuously rock back and forth relative to the rear support frame; when the front rocking frame continuously rocks back and forth relative to the rear support frame, the distance between the moving part and the rotating part is alternatively decreased and increased to lift and lower pivoting point of the rear support frame and the front rocking frame relative to support surface. The rocking chair has automatic rocking and lifting function, and no additional fixing frame is necessary. The power requirement is low. When the moving part and the rotating part are wheels, the rocking chair can also be used as a stroller.

20 Claims, 15 Drawing Sheets

(56) References Cited

U.S. PATENT DOCUMENTS

| | | | | |
|---|---|---|---|---|
| 2003/0098562 A1* | 5/2003 | Lerner | ...................... | B62B 9/22 280/47.41 |
| 2016/0107670 A1* | 4/2016 | Braidman | ............... | B62B 7/044 280/47.1 |
| 2018/0346010 A1* | 12/2018 | Duboff | ...................... | B62B 9/22 |

* cited by examiner

ROCKING CHAIR

CROSS REFERENCE TO RELATED APPLICATIONS

The present application is a Continuation Application of PCT Application No. PCT/CN2018/095011 filed on Jul. 9, 2018, which claims the benefit of Chinese Patent Application No. 201720847643.9 filed on Jul. 12, 2017. All the above are hereby incorporated by reference.

FIELD OF THE INVENTION

This invention relates to a rocking chair.

BACKGROUND OF THE INVENTION

As a kind of game device, the rocking chair brings leisure and amusement experience to users, is increasingly favored by people, and especially in the field of parenting, has become a necessary equipment for parents in the process of child rearing. Most of the existing rocking chairs do not have automatic rocking function, and during the interaction with children, the parents can only give their children the experience of rocking chair manually, which brings physical burden to the parents. In addition, some existing rocking chairs that can rise and fall alternately need to be fixed with an addition fixing frame to prevent rocking chair and support surface from moving in a large range during the process of rising and falling alternately, which may cause safety risks. Moreover, such rocking chairs have disadvantages such as complicated structure, high manufacturing cost, large size, inconvenience in handling, fail to meet the higher requirement of the people.

SUMMARY OF INVENTION

To overcome the deficiency of the prior art, this invention provides a rocking chair, which does not need the addition fixing frame, can be lifted and lowered alternately by an electric rocking drive mechanism, and has advantages such as low cost, convenience in handling, novel design, simple structure, and the like.

The technical solution of the invention is as follows:

A rocking chair comprises a rear support frame, a front rocking frame pivoted on the rear support frame and used as a front support frame, a rotating part arranged at the bottom of the rear support frame, and a moving part arranged at the bottom of the front rocking frame. The rocking chair further comprises an electric rocking drive mechanism able to drive the front rocking frame to continuously rock back and forth relative to the rear support frame. When the front rocking frame rocks back and forth relative to the rear support frame, the distance between the moving part and the rotating part is decreased and increased alternatively to alternatively lift and lower the pivoting point of the rear support frame and the front rocking frame relative to the support surface.

Preferably, a rotating shaft driven by the electric rocking drive mechanism to rotate and drive the front rocking frame to rock back and forth is arranged between the rear support frame and the front rocking frame.

More preferably, the electric rocking drive mechanism comprises a first joint seat arranged on the rear support frame, and a second joint seat arranged on the front rocking frame and movably connected with the first joint seat. A drive motor is arranged on the first joint seat. A drive gear is fixed on the output shaft of the drive motor. The rotating shaft is arranged on the second joint seat, and a driven gear engaging with the drive gear to drive the front rocking frame to rock is arranged on the rotating shaft.

Preferably, the moving part is a wheel arranged on the front rocking frame.

Preferably, a rotating shaft is arranged between the rear support frame and the front rocking frame, one part of the electric rocking drive mechanism is pivoted to the front rocking frame or the rear support frame by a drive shaft. The drive shaft deviates from the rotating shaft. Another part of the electric rocking drive mechanism is arranged on the rear support frame or the front rocking frame.

Preferably, the electric rocking drive mechanism comprises a drive end and a rocking output assembly with an output end. The drive end is arranged on the rear support frame. The output end of the rocking output assembly is pivoted to the front rocking frame by the drive shaft. The rocking output end is driven by the drive end to rock the front rocking frame back and forth relative to the rear support frame. In this embodiment, the output end of the rocking output assembly constitutes one part of the electric rocking drive mechanism, and the drive end and the rocking output assembly constitutes another part of the electric rocking drive mechanism.

Further, the electric rocking drive mechanism comprises a drive motor fixed on the rear support frame. A drive assembly driving the front rocking frame to rock front and back relative to the rear support frame is arranged between the output shaft of the drive motor and the front rocking frame.

Further, the drive assembly comprises a rotating member arranged on the output shaft of the drive motor, and a lifting member pivoted to the rotating member. The pivoting point of the lifting member and the rotating member deviates from the axes of the rotating member, and another end of the lifting member is pivoted to the front rocking frame.

In the above technical solution, one end of the lifting member is pivoted to the rotating member, another end of the lifting member is pivoted to the front rocking frame by the drive shaft. When the rotating member is driven to rotate by the drive motor, because the lifting member is eccentrically pivoted to the rotating member, the lifting member rocks back and forth with the rotation of the rotating member to rock the front rocking frame pivoted to the lifting member back and forth relative to the rear support.

The drive motor constitutes the drive end of the electric rocking drive mechanism, the drive assembly constitutes the rocking output assembly of the electric rocking drive mechanism, and the end of the lifting member pivoted to the front rocking frame constitutes the output end of the rocking output assembly.

Further, the drive motor comprises a motor body, and a reduction gear set connected with the motor shaft of the motor body. The output shaft of the reduction gear set is used as the output shaft of the drive motor.

More preferably, a lock mechanism for locking the drive assembly onto the rear support frame is arranged between the rear support frame and the drive assembly.

Further, the lock mechanism comprises a lock hole arranged on the rotating member, and a lock pin arranged on the rear support frame and matching with the lock hole. A unlocking key is arranged between the rear support frame and the lock pin to drive the lock pin to separate from the lock hole. A reset spring is arranged between the lock pin and the rear support frame to drive the lock pin to insert into the lock hole.

Further, the rocking chair further comprises a seat body, and the seat body is arranged on the front rocking frame and/or the rear support frame. When the front rocking frame continuously rocks back and forth relative to the rear support frame, the seat body rocks with the front rocking frame, and the seat body can be lifted and lowered alternatively relative to the supporting surface.

Preferably, the seat body is fixed on the front rocking frame, and the seat body comprises a seat part and a backrest. The seat body is low in middle and high at two ends. When the front rocking frame continuously rocks back and forth relative to the rear support frame, the seat body is lifted or lowered alternatively relative to the support surface while the angle of the seat part and the backrest of the seat body relative to the supporting surface is changed.

Further, a folding mechanism is arranged on the front rocking frame. The drive assembly comprises a drive output end. The drive output end is pivoted to the front rocking frame. The folding mechanism is arranged between the pivoting point of the front rocking frame and the rear support frame and the pivoting point of the drive output end and the front rocking frame, and the front rocking frame can be folded by the folding mechanism.

Preferably, a drive gear is arranged on the front rocking frame, the electric rocking drive mechanism is arranged on a part of the rear support frame away from the rotating part, and a rocking gear matching with the drive gear is arranged on the electric rocking drive mechanism.

Further, the electric rocking drive mechanism comprises a drive motor, a rotating member and a turning member. The drive motor comprises a motor body and a reduction gear set connected with the motor shaft of the motor body. The reduction gear set comprises an output shaft. The rotating member is pivoted to the output shaft. One end of the turning member is pivoted to the rotating member, and another end of the turning member is eccentrically pivoted to the rocking gear.

the technical feature that the turning member is eccentrically pivoted to the rotating member means that the pivoting point of the turning member and the rotating member deviates from the axes of the rotating member. The technical feature that another end of the turning member is eccentrically pivoted to the rocking gear means that the pivoting point of the turning member and the rocking gear deviates from the axes of the rocking gear.

In the above technical solution, the rocking gear is driven by the turning member to rock back and forth so as to drive the drive gear to rock back and forth, achieving the back and forth rocking of the front rocking frame relative to the rear support frame. The rocking gear comprises a drive bar, one end of which is rotatably connected with the turning member, and a drive gear part arranged on another end of the drive bar and in gear engagement with the drive gear.

Preferably, the electric rocking drive mechanism is arranged on the front rocking frame. When the moving part is driven by the electric rocking drive mechanism to continuously rock back and forth, the distance between the moving part and the rotating part is decreased and increased alternatively to alternatively lift and lower the pivoting point of the rear support frame and the front rocking frame relative to the support surface.

Further, the electric rocking drive mechanism comprises a drive motor arranged on the front rocking frame, a rotating member, a drive member and a rocking member. The drive motor comprises a motor body, and a reduction gear set connected with the motor shaft of the motor body. The reduction gear set comprises an output shaft. The rotating member is pivoted to the output shaft. The drive member is eccentrically pivoted to the rotating member. The rocking member is eccentrically pivoted to the drive member. The rocking member is connected with the moving part to drive the moving part to rock back and forth.

When the rotating member is driven by the drive motor to rotate, and the moving part is driven by the rocking member to continuously rock back and forth, the distance between the moving part and the rotating part is decreased and increased alternatively to alternatively lift and lower the pivoting point of the rear support frame and the front rocking frame relative to the support surface.

The output shaft of the reduction gear set is used as the output shaft of the drive motor. The rotating member and the drive member are driven by gearing-down of the reduction gear set to move eccentrically so as to achieve the stable and continuous back and forth rocking of the front rocking frame relative to the rear support frame. The back and forth rocking is stable and the whole rocking chair is more stable.

In the above solution, two-stage or multi-stage gear set may be selected as the reduction gear set according to the output torque of the drive motor and actual drive requirement.

In the above solution, the moving part and the rotating part are a wheel, so the rocking chair can be pushed under a non-rocking state to provide the function of a stroller.

Compared with the prior art, this invention has the following advantages:

By arranging the electric rocking drive mechanism to drive the front rocking frame provided with the moving part at the bottom to continuously rock back and forth relative to the rear support frame provided with the rotating part at the bottom so as to alternatively lift and lower the seat body, the rocking chair of this invention is effort-saving and has low power cost, and the electric rocking drive mechanism has simple structure and is not easy to damage. Rocking can be achieved only by low supply voltage 6V.

As the weight of the seat body directly acts on the front rocking frame and the rear support frame, the power requirement of the electric rocking drive mechanism is lower than that of existing rocking chair, the rocking chair according to this invention overcomes the defect that the weight of the seat body of the existing electric rocking chair directly acts on the electric rocking drive mechanism. As the external pressure load applied to the electric rocking drive mechanism of the rocking chair is significantly decreased, the power requirement is lower, rocking can be achieved by 6V supply voltage, for example, by a dry battery, reducing power cost and providing higher security for the consumers.

The rocking chair according to this invention overcomes the defect of the prior art that the seat body can only be alternately lifted and lowered. The seat body according to this invention can be lifted and lowered while the seat body can rock back and forth relative to the rocking chair. The seat body is arranged on the front rocking frame, when the front rocking frame is driven by the electric rocking drive mechanism to continuously rock back and forth relative to the rear support frame, the seat body is alternatively lifted and lowered relative to the support surface of the rocking chair, while the seat body continuously rocks back and forth relative to the rocking chair, so as to achieve the mode of alternative lifting and lowering and continuous back and forth rocking of the sea body, so the rocking chair according to this invention has more t functions, improves the enjoyment of the children and meets the multifunctional requirement of the children.

The rocking chair according to this invention overcomes the defect of the prior art that additional supporting structure is necessary to fix the rocking chair. The front rocking frame arranged with the moving part at the bottom can rock relative to the rear support frame and can also be used as the supporting structure, and the rear support frame arranged with the rotating part at the bottom can be used as the supporting structure and can also be used as the fixing structure for preventing the rocking chair from moving in large area on the contact surface, so as to ensure that no potential safety hazard exists during use of the rocking chair.

The moving part and the rotating part of the rocking chair according to this invention are a wheel to provide pushing function for the rocking chair, further increasing the use function and improving practicability of the rocking chair.

In conclusion, the rocking chair according to this invention has advantages such as simpler structure, lower cost, foldability, convenience in carrying, better operability to achieve alternative lifting and lowering function.

DETAILED DESCRIPTION OF ILLUSTRATED EMBODIMENTS

Example 1

Figure 1:
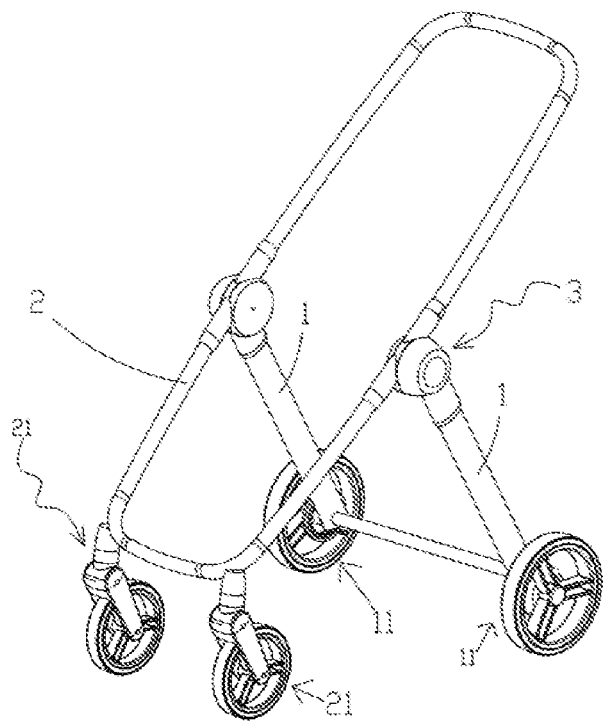
FIG. 1 shows the structure diagram of Example 1 according to this invention in use status.

As shown in FIG. 1, the rocking chair comprises the front rocking frame 2 provided with the moving part 21, the rear support frame 1 provided with the rotating part 11 at the bottom, and a seat body arranged on the front rocking frame 2 (not shown in the figure). The rotating shaft 100 is arranged between the rear support frame 1 and the front rocking frame 2 and driven by the electric rocking drive mechanism 3 to rock the front rocking frame 2 back and forth. The rotating shaft 100 is designed to transmit power to the front rocking frame 2.

Figure 2:
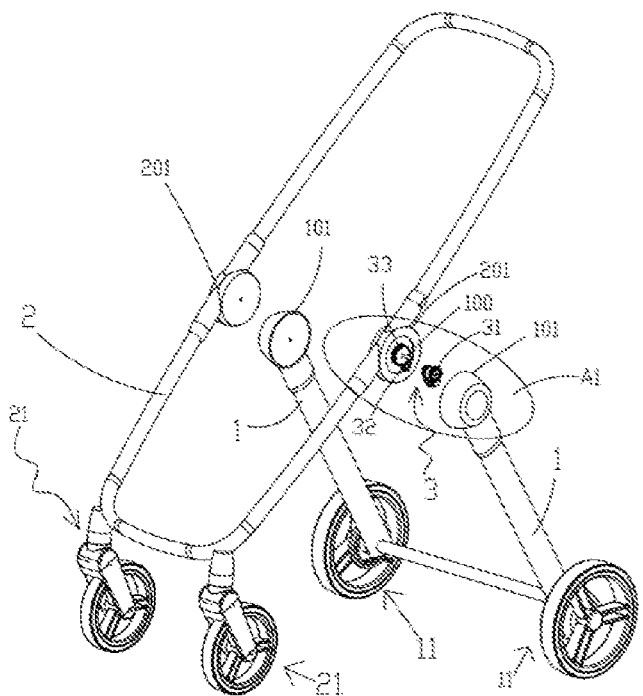
FIG. 2 shows the explosive view of the electric rocking drive mechanism according to Example 1.
Figure 3:
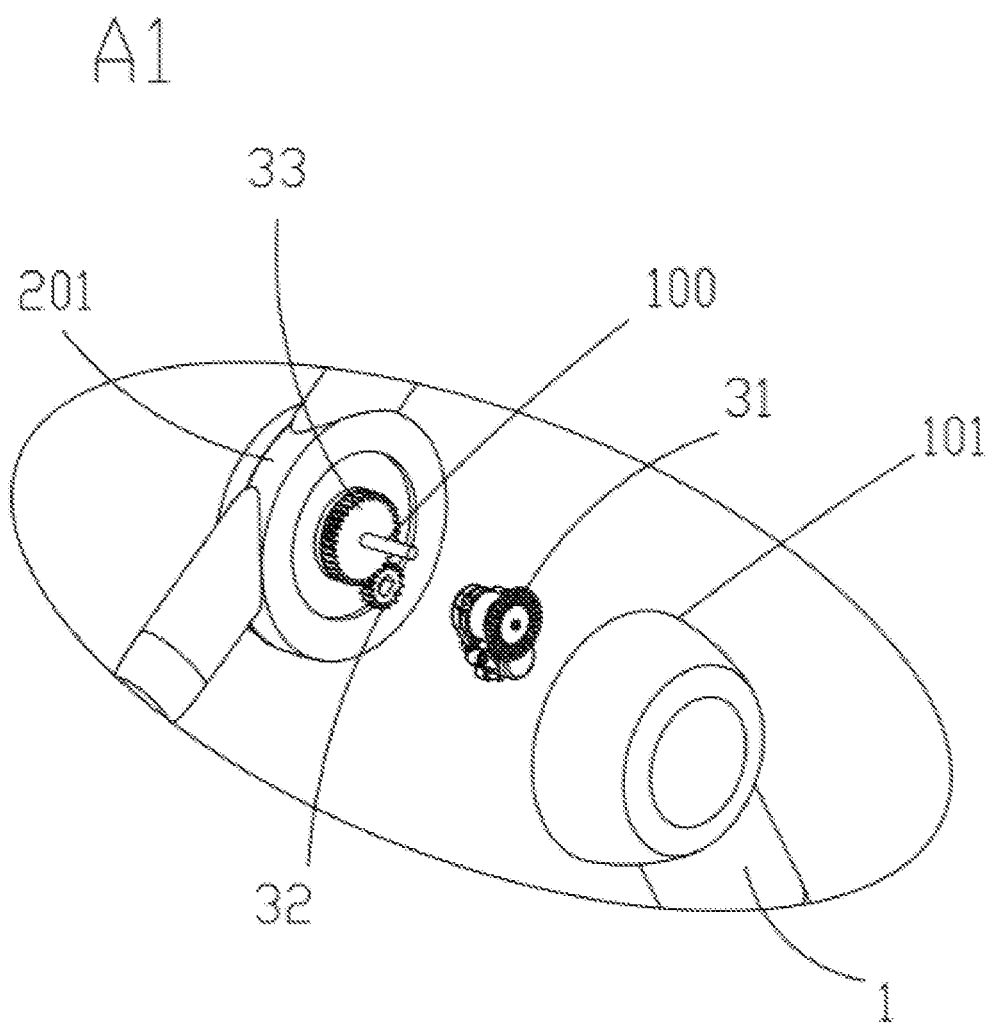
FIG. 3 shows the amplifying structure diagram of A1 shown in FIG. 2.

As shown in FIGS. 2-3, the electric rocking drive mechanism 3 comprises the first joint seat 101 arranged on the rear support frame 1, and the second joint seat 201 arranged on the front rocking frame 2 and movably connected with the first joint seat 101. The drive motor 31 is arranged on the first joint seat 101. The drive gear 32 is fixed on the output shaft 319 of the drive motor 31. The rotating shaft 100 is arranged on the second joint seat 201. The driven gear 33 engaging with the drive gear 32 to rock the front rocking frame 2 is arranged on the rotating shaft 100. The output power of the drive motor 31 is transmitted to the rotating shaft 100 on the second joint seat 201 by the engagement of the drive gear 32 with the driven gear 33 to drive the front rocking frame 2 to rock.

Figure 4:
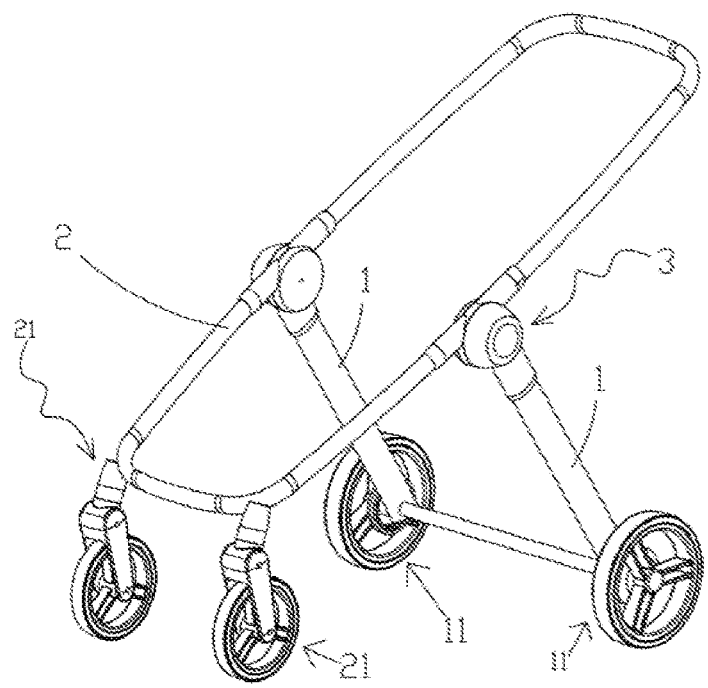
FIG. 4 shows the structure diagram of Example 1 according to this invention in another status.

FIG. 1 shows the rocking chair with the above structure in one use status, wherein the front rocking frame is driven by the electric rocking drive mechanism to rock back and forth relative to the rear support frame, the distance between the moving part and the rotating part decreases to provide the use status in which the pivoting point of the front rocking frame and the rear support frame is lifted relative to the support surface. FIG. 4 shows the rocking chair with the above structure in another use status, wherein the front rocking frame is driven by the electric rocking drive mechanism to rock back and forth relative to the rear support frame, the distance between the moving part and the rotating part increase to provide the use status in which the pivoting point of the front rocking frame and the rear support frame is lowered relative to the support surface.

In this example, the moving part and the rotating part are wheels.

Example 2

Figure 5:
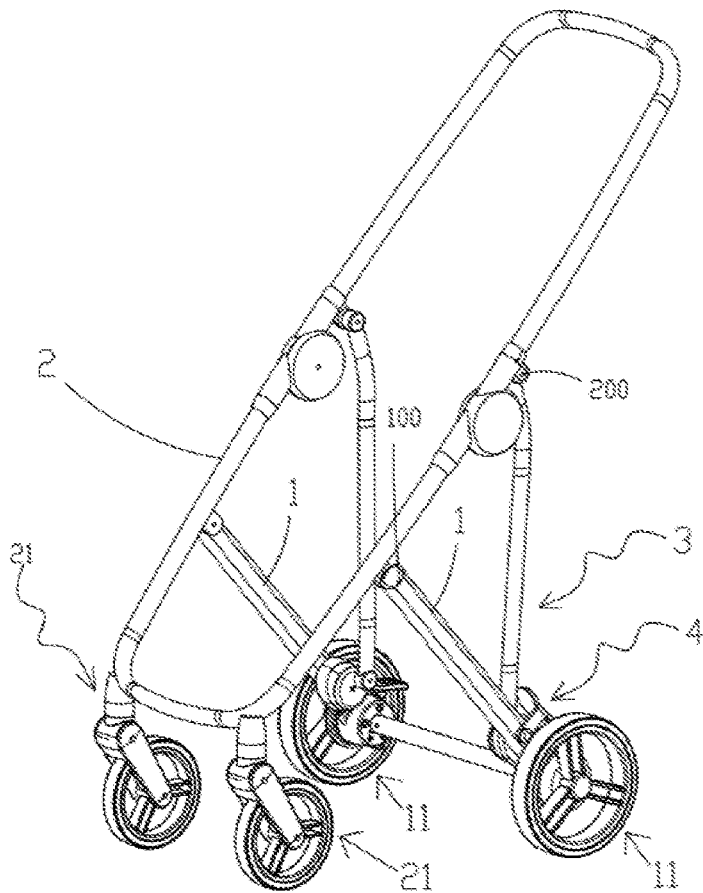
FIG. 5 shows the structure diagram of Example 2 according to this invention in use status.

As shown in FIG. 5, the rocking chair comprises the front rocking frame 2 provided with the moving part 21, the rear support frame 1 provided with the rotating part 11 at the bottom, and the electric rocking drive mechanism 3 arranged on the rear support frame 1 and driving the front rocking frame 2 to rock back and forth relative to the front rocking frame 2. The rotating shaft 100 is arranged between the rear support frame land the front rocking frame 2.

The seat body 12 is fixed onto the front rocking frame 2. The seat body 12 comprises the seat part 121 and the backrest 122. The seat body 12 is lower in middle and high at two ends. When the front rocking frame 2 continuously rocks back and forth relative to the rear support frame 1, the seat body 12 is continuously and alternatively lifted and lowered relative to the support surface, while the angle of the seat part 121 and the backrest 122 of the seat body 12 relative to the supporting surface is changed. When the seat body 12 is away from the support surface, the included angle between the seat part 121 and the support surface becomes small, and the included angle between the backrest 122 and the support surface becomes large. When seat body 12 is close to the support surface, the included angle between the seat part 121 and the support surface becomes large, and the included angle between the backrest 122 and the support surface becomes small.

When the product is used, the child sits on the seat body 12, he can be lifted or lowered with the location change of the seat body 12 while can be rocked front and back, so the function of the product is increased and the enjoyment is improved.

Figure 6:
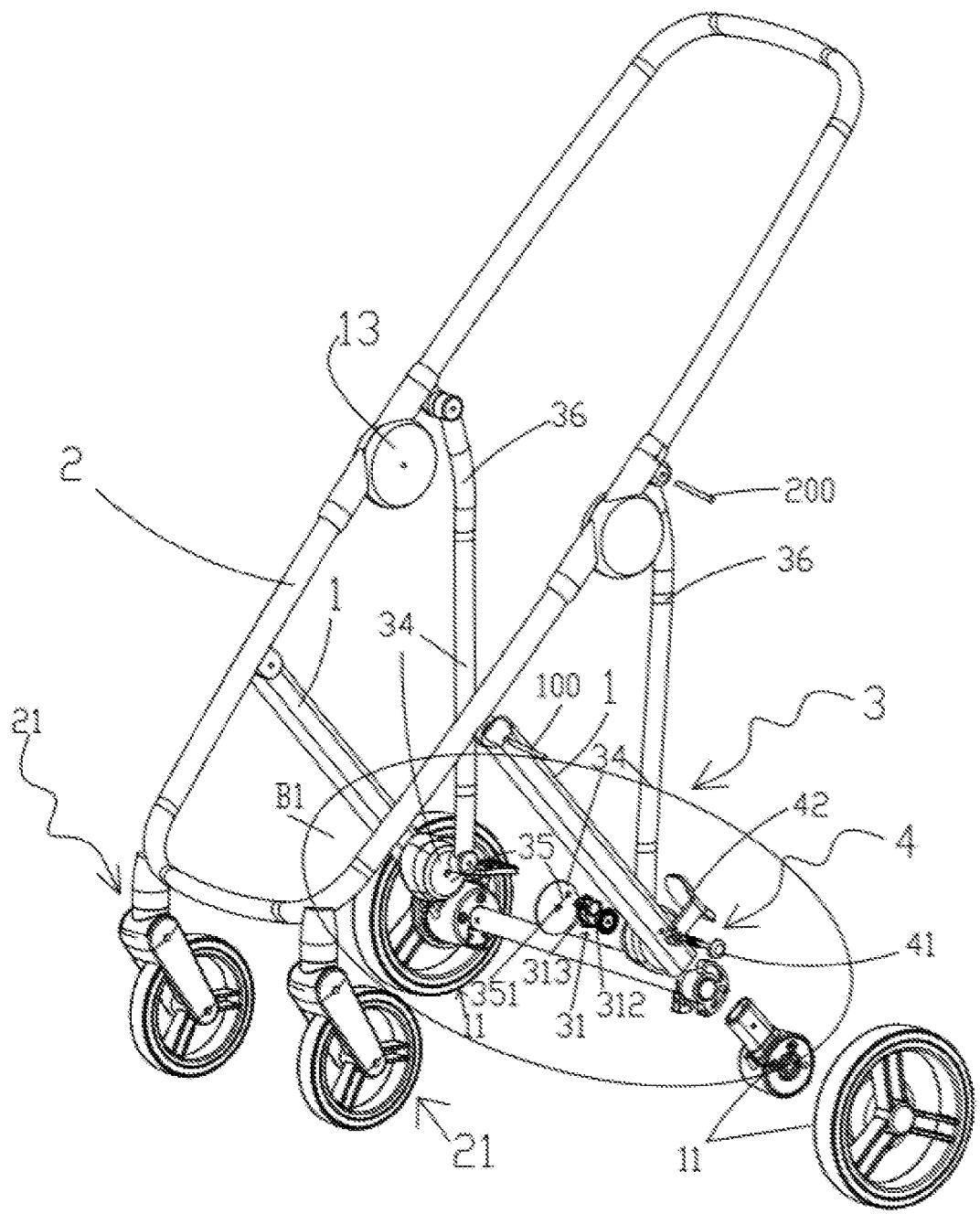
FIG. 6 shows explosive view of the electric rocking drive mechanism according to Example 2.

As shown in FIG. 6, the electric rocking drive mechanism 3 comprises the drive motor 31 and the drive assembly 34. The drive motor 31 is fixed on the rear support frame 1. The drive assembly 34 is arranged between the output shaft 319 of the drive motor and the front rocking frame 2 so that the front rocking frame 2 is driven by the drive motor 31 to rock front and back relative to the rear support frame 1.

Figure 7:
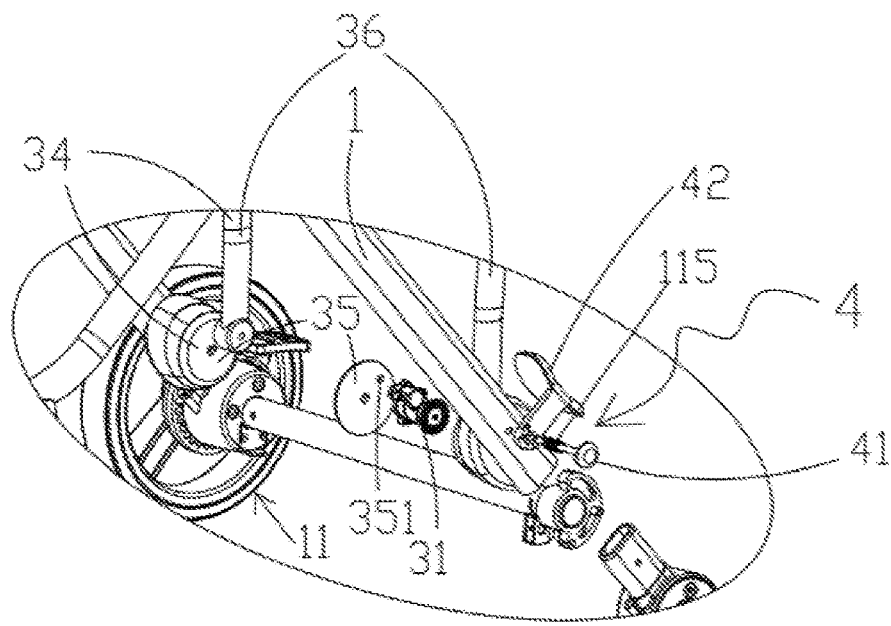
FIG. 7 shows the amplifying structure diagram of B1 shown in FIG. 6.

As shown in FIGS. 6-7, the drive assembly 34 comprises the rotating member 35 arranged on the output shaft 319 of the drive motor, and the lifting member 36 with one end pivoted to the rotating member 35. The pivoting point of the lifting member 36 and the rotating member 35 deviates from the axes of the rotating member 35 (not shown in the figure), and another end of the lifting member 36 is pivoted to the front rocking frame 2.

The rotating member 35 corresponds to a crank and is driven by the drive motor 31 to rotate around the output shaft 319 to lift and lower the lifting member 36, driving the front rocking frame 2 to rock front and back relative to the rear support frame 2.

As shown in FIG. 6, in order to output adequate driving power, the drive motor 31 comprises the motor body 312, and the reduction gear set 313 connected onto the motor shaft of the motor body 312. The output shaft of the reduction gear set 313 is used as the output shaft 319 of the drive motor. In this embodiment, the reduction gear set 313 is a two-stage gear set.

The reduction gear set 313 can improve the final output torque of the drive motor 31 to ensure that the mechanism have adequate power during rocking.

In this embodiment, the drive motor 31 of the electric rocking drive mechanism is arranged on the support frame 1. The lift rod 36 of the drive assembly 34 is pivoted to the rear part 212 of the front rocking frame 2 to directly achieve the rocking function with the repeated change in the relative location, or relative angle of the front rocking frame 2 and rear support frame 1.

The electric rocking drive mechanism 3 is arranged between the front rocking frame 2 and the rear support frame 1. As movement is relative, there is no difference for two connection modes that one end of the electric rocking drive mechanism 3 is connected with the front rocking frame 2 or the rear support frame 1, and another end is connected with the rear support frame for front rocking frame 2.

Figure 8:
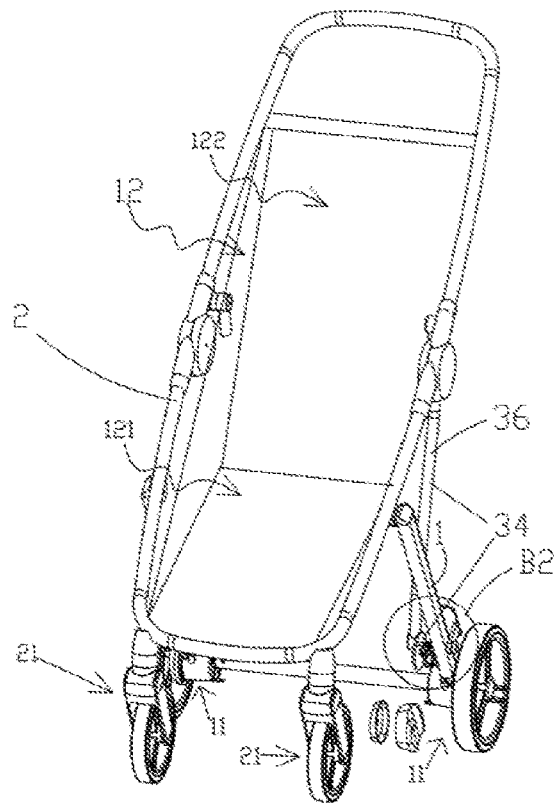
FIG. 8 shows the structure diagram of Example 2 upon locking the drive assembly by the lock mechanism.
Figure 9:
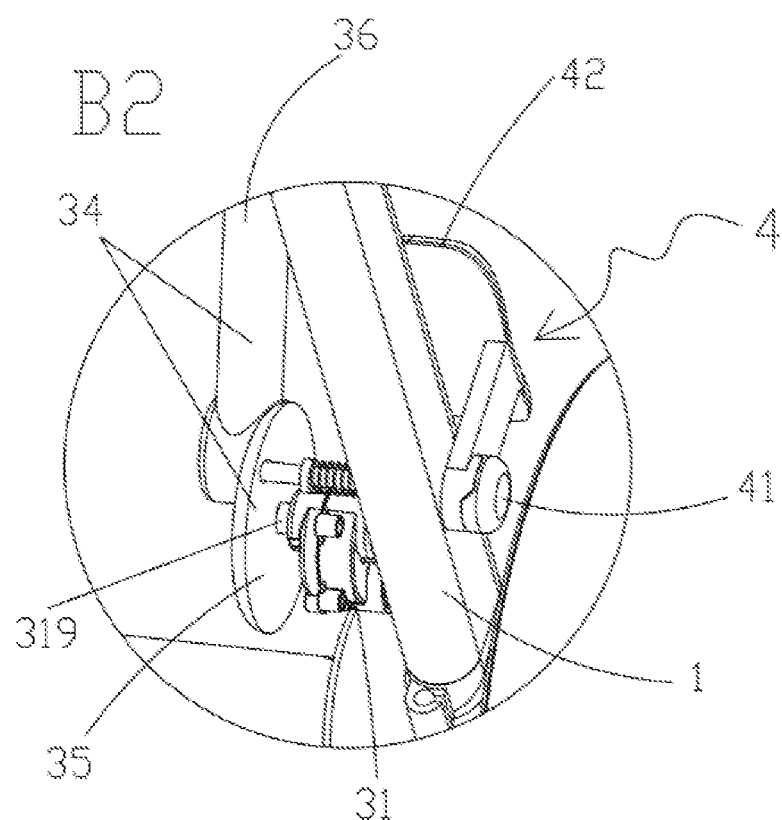
FIG. 9 shows the amplifying structure diagram of B2 shown in FIG. 8.

To ensure the stability of the rocking chair in non-rocking status, the lock mechanism 4 is arranged between the rear support frame 1 and the drive assembly 34 to lock the drive assembly 34 onto the rear support frame 1. When the lock mechanism 4 is in locking status, as shown in FIG. 8 and FIG. 9, the rocking chair is in non-rocking status, the drive assembly 34 is fixed onto the rear support frame 1 to limit rocking. When the lock mechanism 4 is in unlocking status, as shown in FIG. 10 and FIG. 11, the drive assembly 34 is not locked with the rear support frame 1, and the rocking chair is in rocking status, the front rocking frame 2 is driven under the action of the drive motor 31 and the drive assembly 34 to move back and forth relative the rear support frame 1 to achieve rocking function.

Figure 10:
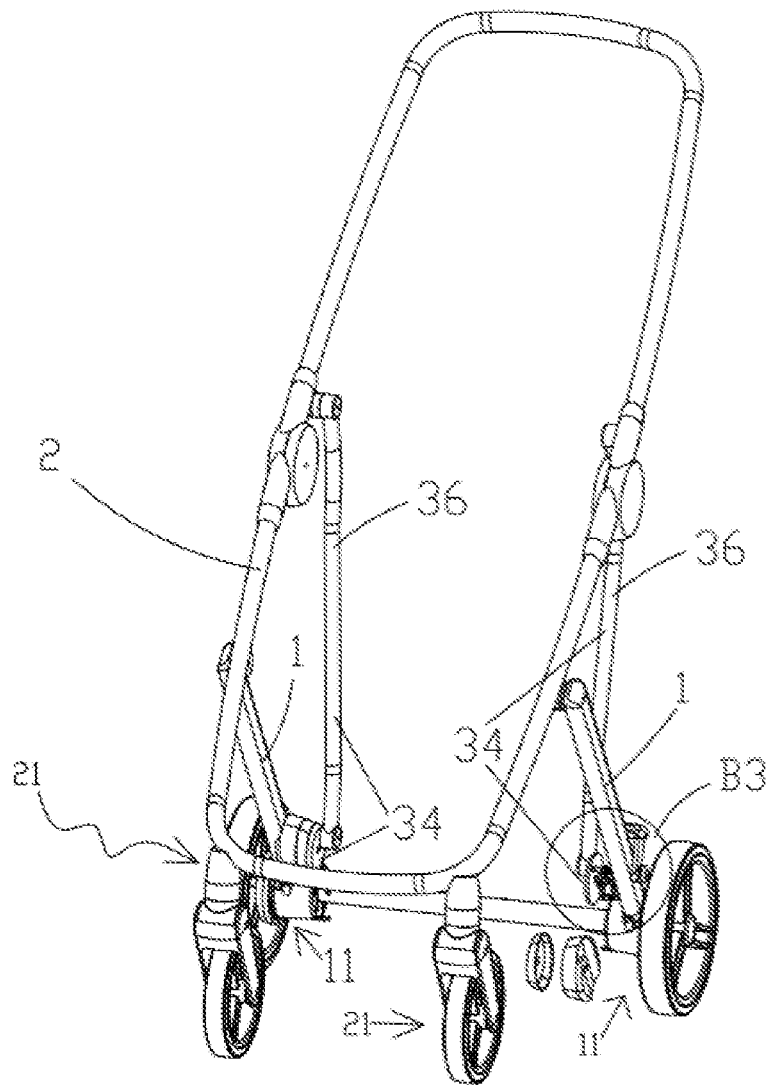
FIG. 10 shows the structure diagram of Example 2 upon unlocking the drive assembly by the lock mechanism.
Figure 11:
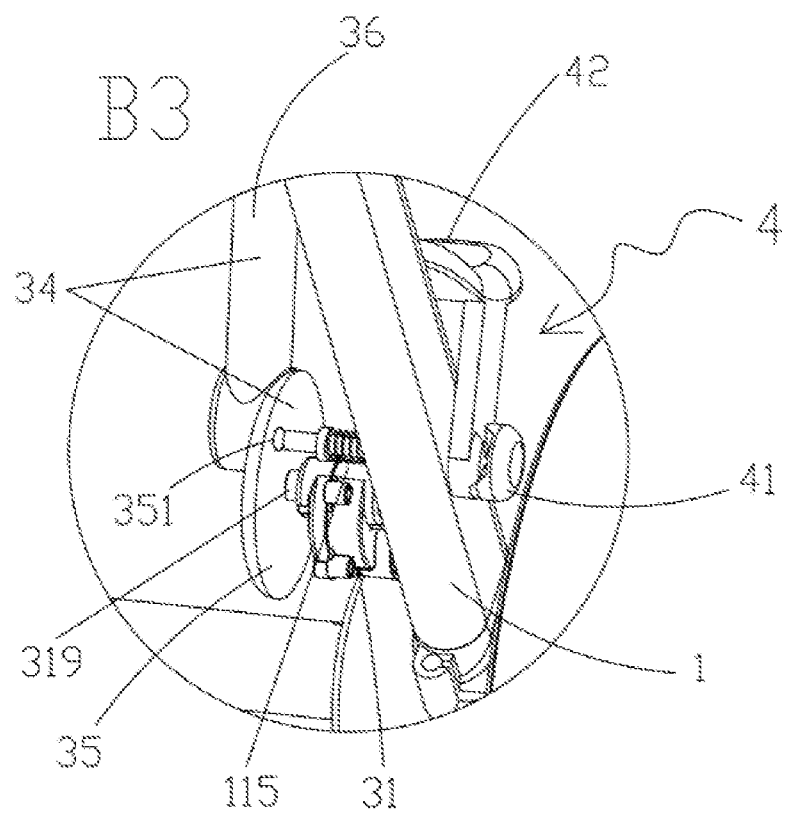
FIG. 11 shows the amplifying structure diagram of B3 shown in FIG. 10.

As shown in FIGS. 10-11, the lock mechanism 4 comprises the lock hole 351 arranged on the rotating member 35, and the lock pin 41 arranged on the rear support frame 1 and matching with the lock hole 351. The unlocking key 42 is arranged between the rear support frame 1 and the lock pin 41 to separate the lock pin 41 from the lock hole. The reset spring 115 is arranged between the lock pin 41 and the rear support frame 1 to insert the lock pin 41 into the lock hole 351. The lock pin 41 is inserted to the lock hole 351 on the rotating member 35 by the unlocking key 42 to lock the rotating member 35, thus locking the drive assembly 34 to limit the rocking function of the rocking chair. After the lock pin 41 is separated from the lock hole 351 on the rotating member 3 by the unlocking key 42, the rotating member 35 obtain the freeness of rotation around the axes of the output shaft 319 of the drive motor, and rotates by the driving of the output shaft 319 of the drive motor 31, so as to move the lifting member 35, thus achieving the rocking function of the rocking chair.

Figure 12:
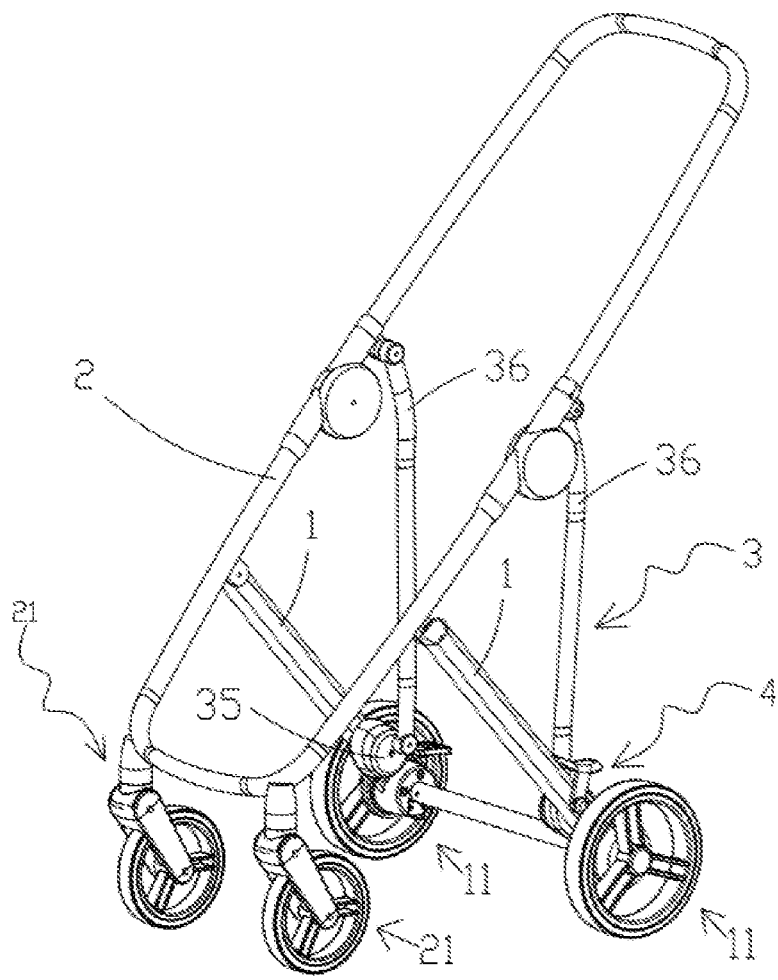
FIG. 12 shows the structure diagram of Example 2 just in unlocking status of the lock mechanism.
Figure 13:
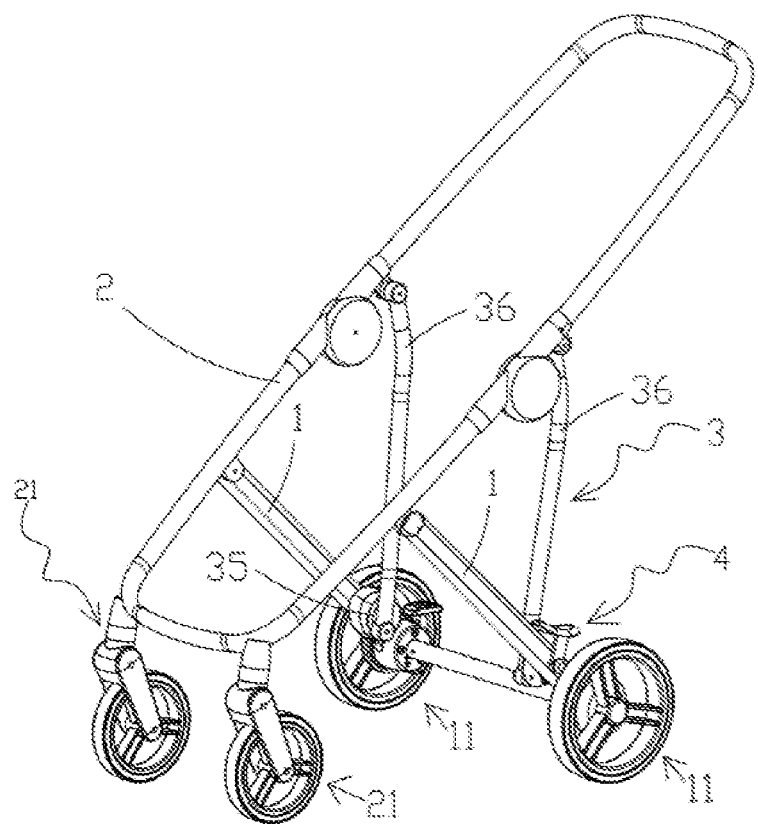
FIG. 13 shows the structure diagram of Example 2 in another status, that is, the front rocking frame is in another location after unlocking status of the lock mechanism.

In combination with the structure of the lock mechanism 4, FIG. 12 shows the structure diagram of example 2 just in unlocking status of the lock mechanism. FIG. 13 shows the structure diagram of example 2 in another status, that is, the front rocking frame is in another location after unlocking status of the lock mechanism.

Figure 14:
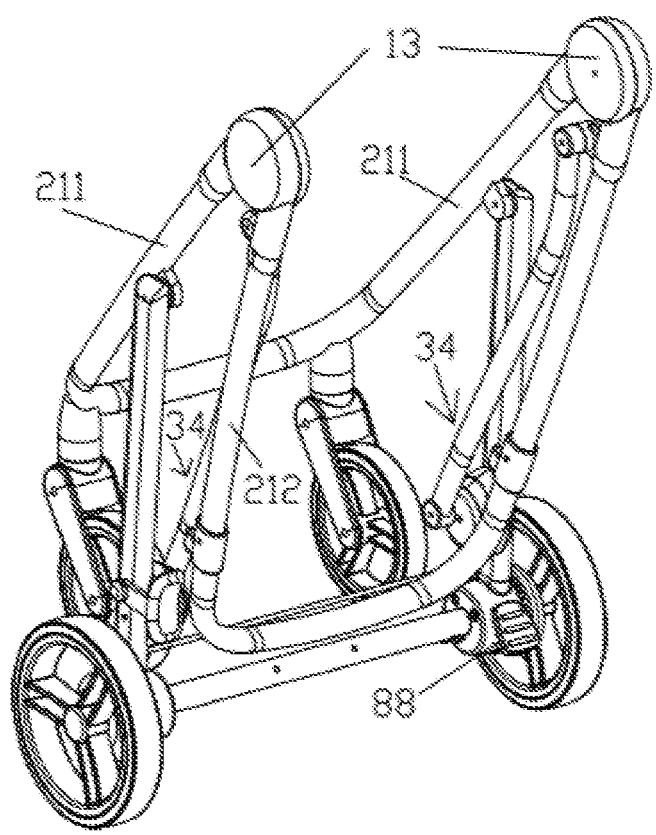
FIG. 14 shows the structure diagram of Example 2 in folded status.

As shown in FIG. 14, the folding mechanism 13 is arranged on the front rocking frame 2. The drive assembly 34 comprises a drive output end. The drive output end is pivoted to the front rocking frame 2. The folding mechanism 13 is arranged between the pivoting point of the front rocking frame 2 and the rear support frame 1 and the pivoting point of the drive output end and the front rocking frame 2, and the front rocking frame 2 can be folded by the folding mechanism 13.

In this embodiment, the structure of the folding mechanism 13 is as follows: a front rotation circle is arranged on the front end of the front rocking frame 2, a rear rotation circle is arranged on the rear end of the front rocking frame, the front rotation circle is concentrically pivoted to the rear rotation circle, a lock pin is arranged on the rear rotation circle, a reset spring is arranged on the rear rotation circle, a lock hole matching with the lock pin is arranged on the front rotation circle. The lock pin is inserted to the lock hole for locking. After the lock pin is separated from the lock hole, the front end and rear end of the front rocking frame can be folded.

When the front rocking frame 2 is folded, the front part 211 of the front rocking frame pivoted to the rear support frame 1 is folded together with the rear support frame 1, and the rear part 212 of the front rocking frame 2 pivoted to the drive assembly 34 is folded together with the drive assembly 34, so as to fold the rear support frame 1 together with the drive assembly 34 and the front rocking frame 2, thus folding the rocking chair to reduce size and facilitate carrying.

The electric rocking drive mechanism 3 of the rocking chair according to example 2 is fixedly connected with the rotating member 35 on the output shaft 319 of the drive motor. The rotating member 35 is pivoted to the lifting member 36, the pivoting point of the lifting member 36 and the rotating member 35 deviates from the axes of the rotating member 35, the lifting member 36 is pivoted to the front rocking frame 2 by the drive shaft 200, the drive shaft 200 deviates from the rotating shaft 100 to increase the arm of force and reduce power, and the lock mechanism 4 is arranged on the rear support frame 1 to lock the rotating member 35 onto the rear support frame 1.

When the drive motor 31 rotates, the front rocking frame 2 is driven by the drive shaft 200 to rock back and forth relative to the rear support frame 1. When the drive motor 31 stops, the front rocking frame 2 is supported by the output shaft 319 of the drive motor 31 fixed on fixed on the rear support frame 1, and the rotating member 35 and the lifting member 36 within a certain range to prevent the fall of the rocking frame with safety and reliability.

When the rocking chair is used in non-rocking status, the rotating member 35 is locked with the rear support frame 1 by the lock mechanism 4 to form a stable triangular structure, as shown in FIG. 8.

In this embodiment, the moving part 21 and the rotating part 11 are the wheels. The rear support frame 1 and the rotating part 11 can be locked by the brake mechanism 88, to fix the rotating part 11 and the rear support frame 1. When the front rocking frame 2 and the rear support frame 1 are fixed, the rotating part and the rear support frame 1 can be movable. The rotating part 11 can be unlocked from the rear support frame 1 by the brake mechanism 88, so the rotating part 11 and the rear support frame 1 can be moved relative to one another, as shown in FIG. 14.

Example 3

Figure 15:
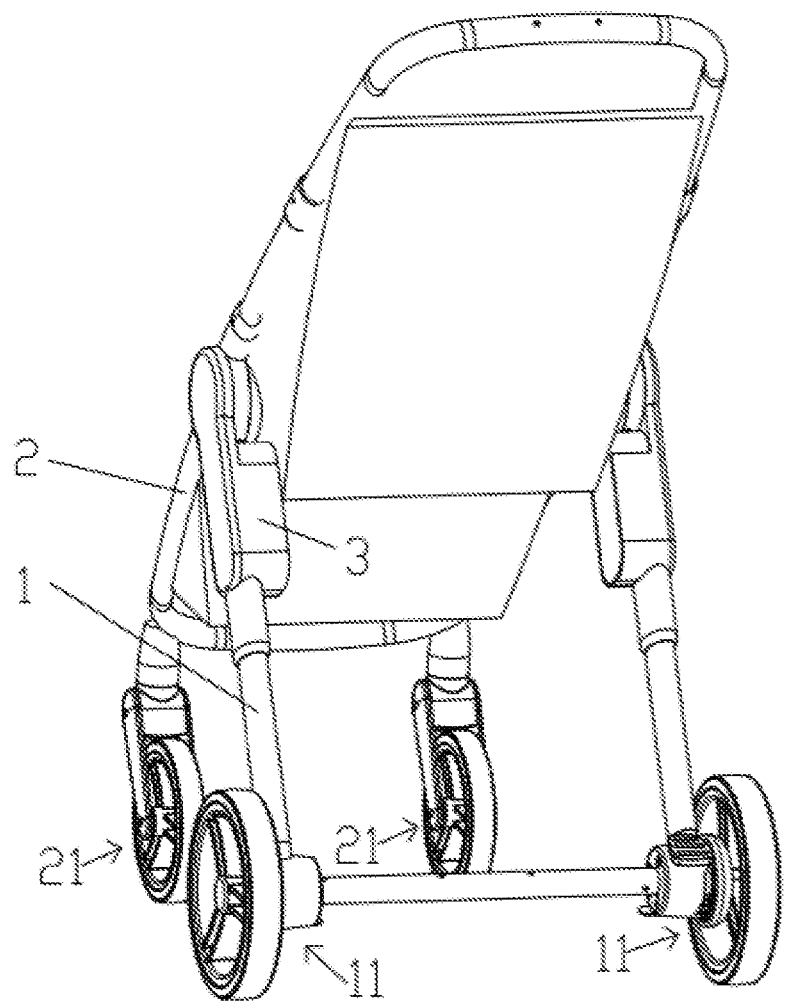
FIG. 15 shows the structure diagram of Example 3.
Figure 16:
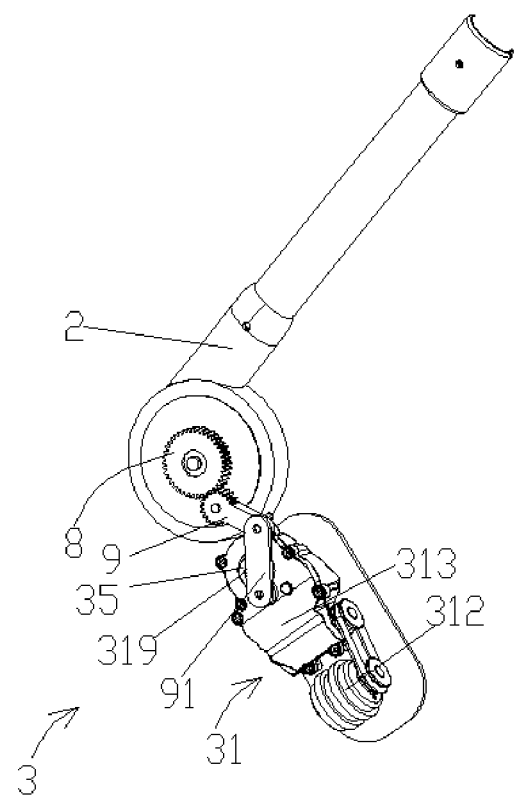
FIG. 16 shows the internal structure diagram of the electric driving mechanism according to Example 3.

As shown in FIG. 15 and FIG. 16, the rocking chair comprises the front rocking frame 2 provided with the moving part 21, the rear support frame 1 provided with the rotating part 11 at the bottom, and the seat body (not shown in the figure) arranged on the front rocking frame 2. The drive gear 8 is arranged on the front rocking frame 2, the electric rocking drive mechanism 3 is arranged on one end of the rear support frame 1 kept away from the rotating part 11, and the rocking gear 9 matching with the drive gear 8 is arranged on the electric rocking drive mechanism 3. The reduction gear set 313 is the two-stage gear set.

The electric rocking drive mechanism 3 comprises the drive motor 31. The drive motor 31 comprise the motor body 312, and the reduction gear set 313 connected with the motor shaft of the motor body 312. The output shaft of the reduction gear set 313 is used as the output shaft 319 of the drive motor. The turning member 91 is pivoted to the output shaft 319 of the drive motor, another end of the turning member 91 is pivoted to the rocking gear 9, and the pivoting point of the turning member 91 and the rocking gear 9 deviates from the axes of the turning member 91. The electric rocking drive mechanism 3 is arranged on the rear support frame 1 to provide simpler structure for the rocking chair.

In this embodiment, the moving part 21 and the rotating part 11 are the wheels.

Example 4

Figure 17:
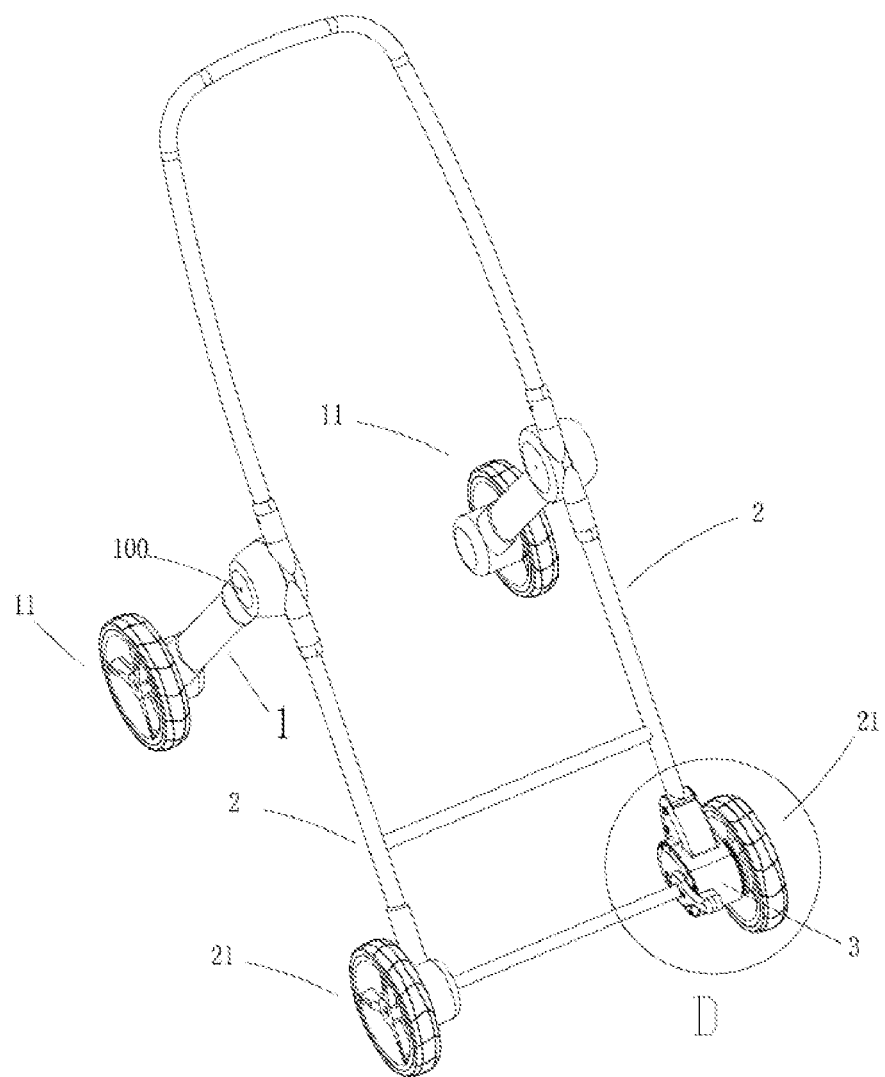
FIG. 17 shows the structure diagram of Example 4.
Figure 18:
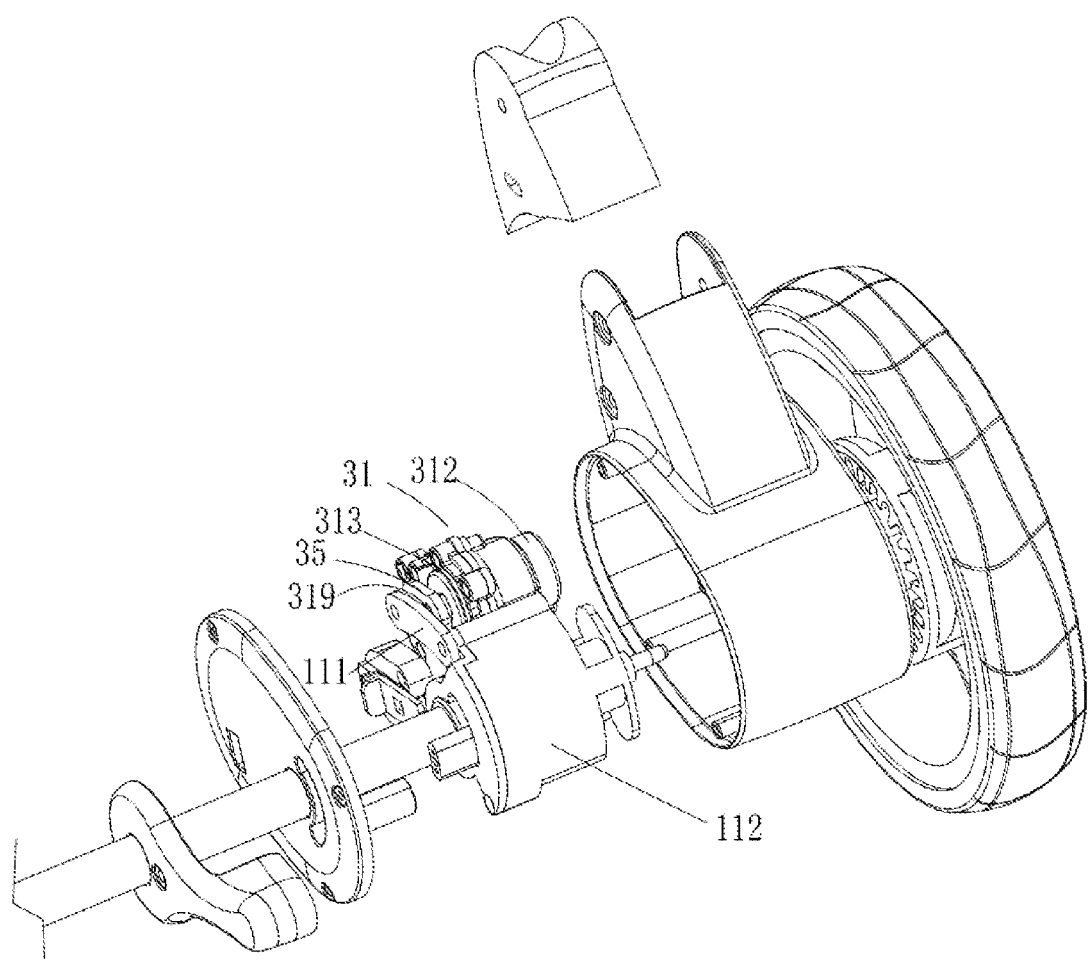
FIG. 18 shows the amplifying sectional view of D of the electric rocking drive mechanism according to Example 4.

As shown in FIG. 17 and FIG. 18, the rocking chair comprises the front rocking frame 2 provided with the moving part 21, the rear support frame 1 provided with the rotating part 11 at the bottom, the seat body (not shown in the figure) arranged on the front rocking frame 2, and the electric rocking drive mechanism 3 arranged on the front rocking frame 2.

The moving part 21 and the rotating part 11 are the wheels. When the moving part 21 is driven by the electric rocking drive mechanism 3 to move back and forth, the distance between the moving part 21 and the rotating part 11 is alternatively decreased and increased to alternatively lift or lower the pivoting point of the rear support frame 1 and the front rocking frame 2 relative to the support surface. The wheels are driven by the electric rocking drive mechanism 3 to rock back and forth relative to the support surface to achieve the alternative decrease and increase in the distance between the moving part 21 and the rotating part 11, thus alternatively lifting and lowering the pivoting point of the rear support frame 1 and the front rocking frame 2 relative to the support surface.

As shown in FIG. 18, the electric rocking drive mechanism 3 comprises the drive motor 31 arranged on the front rocking frame 2, the rotating member 35, the drive member 111, and the rocking member 112. The drive motor 31 comprises the motor body 312 and the reduction gear set 313 arranged on the motor shaft of the motor body 312. The reduction gear set 313 comprises the output shaft 319. The rotating member 35 is pivoted to the output shaft 319, the drive member 111 is eccentrically pivoted to the rotating member 35. The rocking member 11 is eccentrically pivoted to the drive member 111, and the rocking member 11 is connected with the moving part 21.

The rotating member 35 is driven to rotate by the motor body 312, the drive member 111 is driven to move back and forth by the rotating member 35. When the drive member 111 moves back and forth, the rocking member 112 is driven to rotate around the axes to continuously move the moving part 21 back and forth. When the moving part 21 moves back and forth, the front rocking frame 2 is driven to continuously rock back and forth to achieve the alternative decrease and increase in the distance between the moving part 21 and the rotating part 11, thus alternatively lifting and lowering the pivoting point of the rear support frame 1 and the front rocking frame 2 relative to the support surface.

In this embodiment, the reduction gear set 313 is the two-stage gear set. In this embodiment, the moving part 21 and the rotating part 11 are the wheels. The rear support frame 1 and the rotating part 11 can be locked by the brake mechanism 88 to fix the rotating part 11 and the rear support frame 1. When the front rocking frame 2 and the rear support frame 1 are fixed, the rotating part and the rear support frame 1 can be movable.

In examples 1-4, two moving parts 21 are arranged at the bottom of the front rocking frame 2 of the rocking chair, and two rotating parts 11 are arranged at the bottom of the rear support frame 1 to provide four-point support for the rocking chair, which has more stable and safer structure. The moving part 21 and the rotating part 11 are the wheels, the rocking chair can be pushed with the stroller function, thus increasing the use function of the rocking char.

As general knowledge, the seat body of the rocking chair may be arranged as below: the seat body is arranged on the front rocking frame, or the seat body is arranged on the rear support frame, or the seat body is arranged on the front rocking frame and the rear support frame. The seat body may be arranged in fixation mode, which just means fixing the connection point of the seat body and the front rocking frame and/or the rear support frame, for example, by thread connection, welding, clamping, riveting and the like. The seat body may be arranged in movable mode, such as through rotatable connection, pivoting, and hinge joint. Regardless of the final arrangement mode or arrangement form for the seat body, when the front rocking frame 2 continuously rocks back and forth relative to the rear support frame 1, the seat body can be lifted and lowered alternatively relative to the support surface.

In addition, it should be emphasized that in examples 1-4, various locations and modes can be used for arrangement of the electric rocking drive mechanism 3 on the rocking chair, as long as, when the front rocking frame 2 is driven by the electric rocking drive mechanism 3 to continuously rock back and forth relative to the rear support frame 1, the distance between the moving part 21 and the rotating part 11 is decreased and increased alternatively to alternatively lift and lower the pivoting point of the rear support frame 1 and the front rocking frame 2 relative to the support surface The change in the location and mode for arrangement of the electric rocking drive mechanism 3 on the rocking chair falls within the scope of this invention. The previously mentioned support surface refers to the surface supporting the moving part and the rotating part, and generally the ground. The terms "front" and "rear" of the front rocking frame 2 and the rear support frame 1 used herein are only stated designations. The definition of "front" and "rear" may vary with view orientation. While the invention has also been described with reference to the preceding non-limiting examples, it will be understood, of course, that the invention is not limited thereto since modifications maybe made by those skilled in the art.

The invention claimed is:

1. A rocking chair, characterized in that comprising a rear support frame (1), a front rocking frame (2) pivoted to the rear support frame (1) and used as a front support frame, and an electric rocking drive mechanism (3) driving the front rocking frame (2) to continuously rock back and forth relative to the rear support frame (1), a rotating part (11) arranged on a bottom of the rear support frame (1), a moving part (21) arranged on a bottom of the front rocking frame (2); when the front rocking frame (2) continuously rocks back and forth relative to the rear support frame (1), a distance between the moving part (21) and the rotating part (11) is alternatively decreased and increased to alternatively lift and lower a pivoting point of the rear support frame (1) and the front rocking frame (2) relative to a support surface.

2. The rocking chair according to claim 1, characterized in that the rear support frame (1) is pivoted to the front rocking frame (2) by a rotating shaft (100), and the rotating shaft (100) is driven by the electric rocking drive mechanism (3) to rock the front rocking frame (2) back and forth.

3. The rocking chair according to claim 2, characterized in that the electric rocking drive mechanism (3) comprises a first joint seat (101) arranged on the rear support frame (1), a second joint seat (201) arranged on the front rocking frame (2) and movably connected with the first joint seat (101), and a drive motor (31) arranged on the first joint seat (101); an output shaft (319) of the drive motor (31) is fixed with a drive gear (32), the rotating shaft (100) is arranged on the second joint seat (201), and a driven gear (33) engaging with the drive gear (32) to drive the front rocking frame (2) to rock is arranged on the rotating shaft (100).

4. The rocking chair according to claim 1, characterized in that the moving part (21) is a wheel arranged on the front rocking frame (2).

5. The rocking chair according to claim 1, characterized in that a rotating shaft (100) is arranged between the rear support frame (1) and the front rocking frame (2), one part of the electric rocking drive mechanism (3) is pivoted to the front rocking frame (2) or the rear support frame (1) by a drive shaft (200), the drive shaft (200) deviates from the rotating shaft (100), and another part of the electric rocking drive mechanism (3) is arranged on the rear support frame (1) or the front rocking frame (2).

6. The rocking chair according to claim 1, characterized in that the electric rocking drive mechanism (3) comprises a drive motor (31) fixed on the rear support frame (1); a drive assembly (34) is arranged between an output shaft (319) of the drive motor (31) and the front rocking frame (2) to drive the front rocking frame (2) to rock back and forth relative to the rear support frame (1).

7. The rocking chair according to claim 6, characterized in that the drive assembly (34) comprises a rotating member (35) arranged on the output shaft (319) of the drive motor (31), and a lifting member (36) pivoted to the rotating member (35); a pivoting point of the lifting member (36) and the rotating member (35) deviates from an axes of the rotating member (35), and another end of the lifting member (36) is pivoted to the front rocking frame (2).

8. The rocking chair according to claim 7, characterized in that the drive motor (31) comprises a motor body (312), and a reduction gear set (313) connected with a motor shaft of the motor body (312); an output shaft of the reduction gear set (313) is used as the output shaft (319) of the drive motor (31).

9. The rocking chair according to claim 7, characterized in that a lock mechanism (4) is arranged between the rear support frame (1) and the drive assembly (34) to lock the drive assembly (34) onto the rear support frame (1).

10. The rocking chair according to claim 9, characterized in that the lock mechanism (4) comprises a lock hole (351) arranged on the rotating member (35), and a lock pin (41) arranged on the rear support frame (1) and matching with the lock hole (351); a unlocking key (42) is arranged between the rear support frame (1) and the lock pin (41) to separate the lock pin (41) from the lock hole (351), and a reset spring (115) is arranged between the lock pin (41) and the rear support frame (1) to insert the lock pin (41) into the lock hole (351).

11. The rocking chair according to claim 1, characterized in that further comprising a seat body (12) arranged on the front rocking frame (2) and/or the rear support frame (1); when the front rocking frame (2) continuously rocks back and forth relative to the rear support frame (1), the seat body (12) rocks with the front rocking frame (2) while the seat body (12) is lifted and lowered alternatively relative to the support surface.

12. The rocking chair according to claim 11, characterized in that the seat body (12) is fixed on the front rocking frame (2), and the seat body (12) comprises a seat part (121) and a backrest (122), and the seat body (12) is low in middle and high at two ends.

13. The rocking chair according to claim 6, characterized in that a folding mechanism (13) is arranged on the front rocking frame (2), the drive assembly (34) comprises a drive output end, the drive output end is pivoted to the front rocking frame (2), the folding mechanism (13) is arranged between a pivoting point of the front rocking frame (2) and the rear support frame (1), and a pivoting point of the drive output end and the front rocking frame (2), and the front rocking frame (2) can be folded by the folding mechanism (13).

14. The rocking chair according to claim 1, characterized in that a drive gear (8) is arranged on the front rocking frame (2), the electric rocking drive mechanism (3) is arranged on a part of the rear support frame (1) away from the rotating part (11), and a rocking gear (9) matching with the drive gear (8) is arranged on the electric rocking drive mechanism (3).

15. The rocking chair according to claim 14, characterized in that the electric rocking drive mechanism (3) comprises a drive motor (31), a rotating member (35) and a turning member (91); the drive motor (31) comprises a motor body (312), and a reduction gear set (313) connected with a motor shaft of the motor body (312); the reduction gear set (313) comprises an output shaft (319); the rotating member (35) is pivoted to the output shaft (319), one end of the turning member (91) is eccentrically pivoted to the rotating member (35), and another end of the turning member (91) is eccentrically pivoted to the rocking gear (9).

16. The rocking chair according to claim 1, characterized in that the electric rocking drive mechanism (3) is arranged on the front rocking frame (2); when the moving part (21) is driven by the electric rocking drive mechanism (3) to continuously rock back and forth, the distance between the moving part (21) and the rotating part (11) is alternatively decreased and increased to lift and lower alternatively the pivoting point of the rear support frame (1) and the front rocking frame (2) relative to the support surface.

17. The rocking chair according to claim 16, characterized in that the electric rocking drive mechanism (3) comprises a drive motor (31) arranged on the front rocking frame (2), a rotating member (35), a drive member (111), and a rocking member (112); the drive motor (31) comprises a motor body (312), and a reduction gear set (313) connected with a motor shaft of the motor body (312); the reduction gear set (313) comprises a output shaft (319), and the rotating member (35) is pivoted to the output shaft (319), the drive member (111) is eccentrically pivoted to the rotating member (35), the rocking member (112) is eccentrically pivoted to the drive member (111), and the rocking member (112) is connected with the moving part (21) to rock the moving part (21) back and forth.

18. The rocking chair according to claim 1, characterized in that the moving part (21) is a wheel, and the rotating part (11) is a wheel.

19. The rocking chair according to claim 2, characterized in that the moving part (21) is a wheel, and the rotating part (11) is a wheel.

20. The rocking chair according to claim 3, characterized in that the moving part (21) is a wheel, and the rotating part (11) is a wheel.

\* \* \* \* \*